United States Patent [19]
Bergman et al.

[11] Patent Number: 5,909,678
[45] Date of Patent: Jun. 1, 1999

[54] COMPUTER SYSTEMS, METHOD AND PROGRAM FOR CONSTRUCTING STATEMENTS BY DRAGGING AND DROPPING ICONIC REPRESENTATIONS OF SUBCOMPONENT STATEMENTS ONTO A PHRASE TEMPLATE

[75] Inventors: Lawrence Bergman, Mt. Kisco, N.Y.; Loey K. Knapp, Boulder, Colo.; Jerald T. Schoudt, Longmont, Colo.; Barbara L. Skelly, Fort Collins, Colo.

[73] Assignee: International Business Machines Corporation, Armonk, N.Y.

[21] Appl. No.: 08/714,001

[22] Filed: Sep. 13, 1996

[51] Int. Cl.[6] .................................................... G06F 17/30
[52] U.S. Cl. ................................ 707/4; 707/5; 707/531
[58] Field of Search .......................... 704/9, 271; 707/4, 707/531, 5; 345/326, 339, 348, 349, 352, 335; 395/670

[56] References Cited

U.S. PATENT DOCUMENTS

| | | | |
|---|---|---|---|
| 5,421,008 | 5/1995 | Banning et al. | 395/600 |
| 5,428,737 | 6/1995 | Li et al. | 395/161 |
| 5,428,776 | 6/1995 | Rothfield | 395/600 |
| 5,461,710 | 10/1995 | Bloomfield et al. | 395/161 |
| 5,574,908 | 11/1996 | Harding et al. | 395/601 |
| 5,579,471 | 11/1996 | Barber et al. | 395/326 |
| 5,584,024 | 12/1996 | Shwartz | 395/604 |
| 5,586,311 | 12/1996 | Davies et al. | 395/561 |
| 5,590,322 | 12/1996 | Harding et al. | 395/604 |
| 5,721,897 | 2/1998 | Rubinstein | 395/602 |
| 5,721,901 | 2/1998 | Banning et al. | 395/604 |
| 5,721,903 | 2/1998 | Anand et al. | 395/605 |

OTHER PUBLICATIONS

Czejdo et al. "Design and Implementation of an Interactive Graphical Query Interface for a Relational Database Management System", IEEE, pp. 14–20, 1989.

Staes et al. "A Graphical Query Language for object oriented database", IEEE, pp. 205–210, Oct. 1991.

IBM Corp. Application development, "SQL Query and Reporting Tools", PC Magazine, pp. 227–244, Jun. 1995.

*Primary Examiner*—Allen R. MacDonald
*Assistant Examiner*—Hani M. Kazimi
*Attorney, Agent, or Firm*—K. O. Hesse

[57] ABSTRACT

The system, method, and program of this invention enables construction of statements, including queries, programs, and commands, by using drag and drop templates. A predefined phrase template, which is generated and displayed to a user, imposes syntactic and semantic constraints in constructing the statement. Objects representing entities and objects representing subphrases can be dragged and dropped onto phrase receptacles within the phrase and subphrase templates. Complex statements can be constructed from a nesting of subphrases using the drag and drop technique. The constructed statement is displayed to the user along with the subphrase structure of the statement through nested panels.

33 Claims, 14 Drawing Sheets

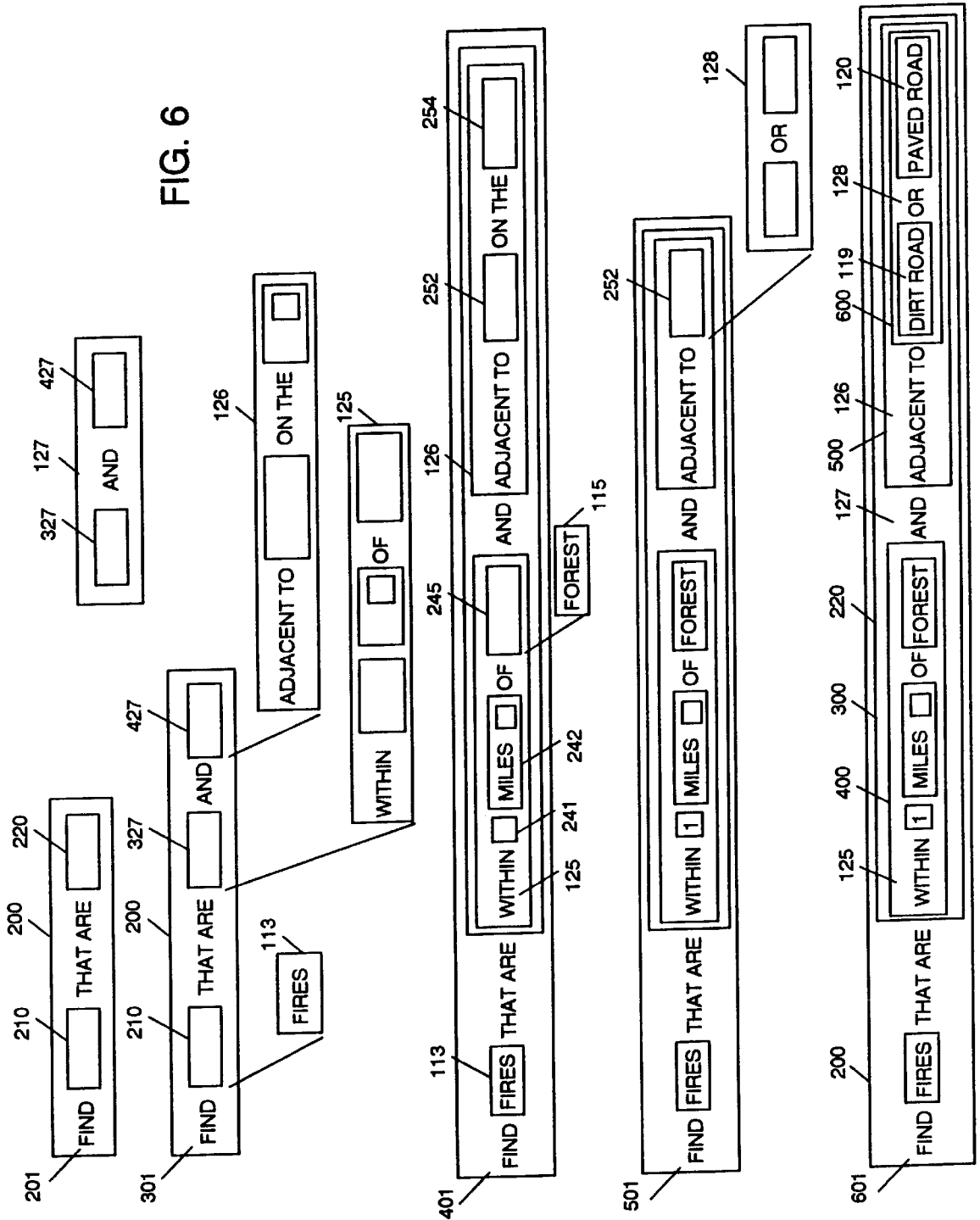

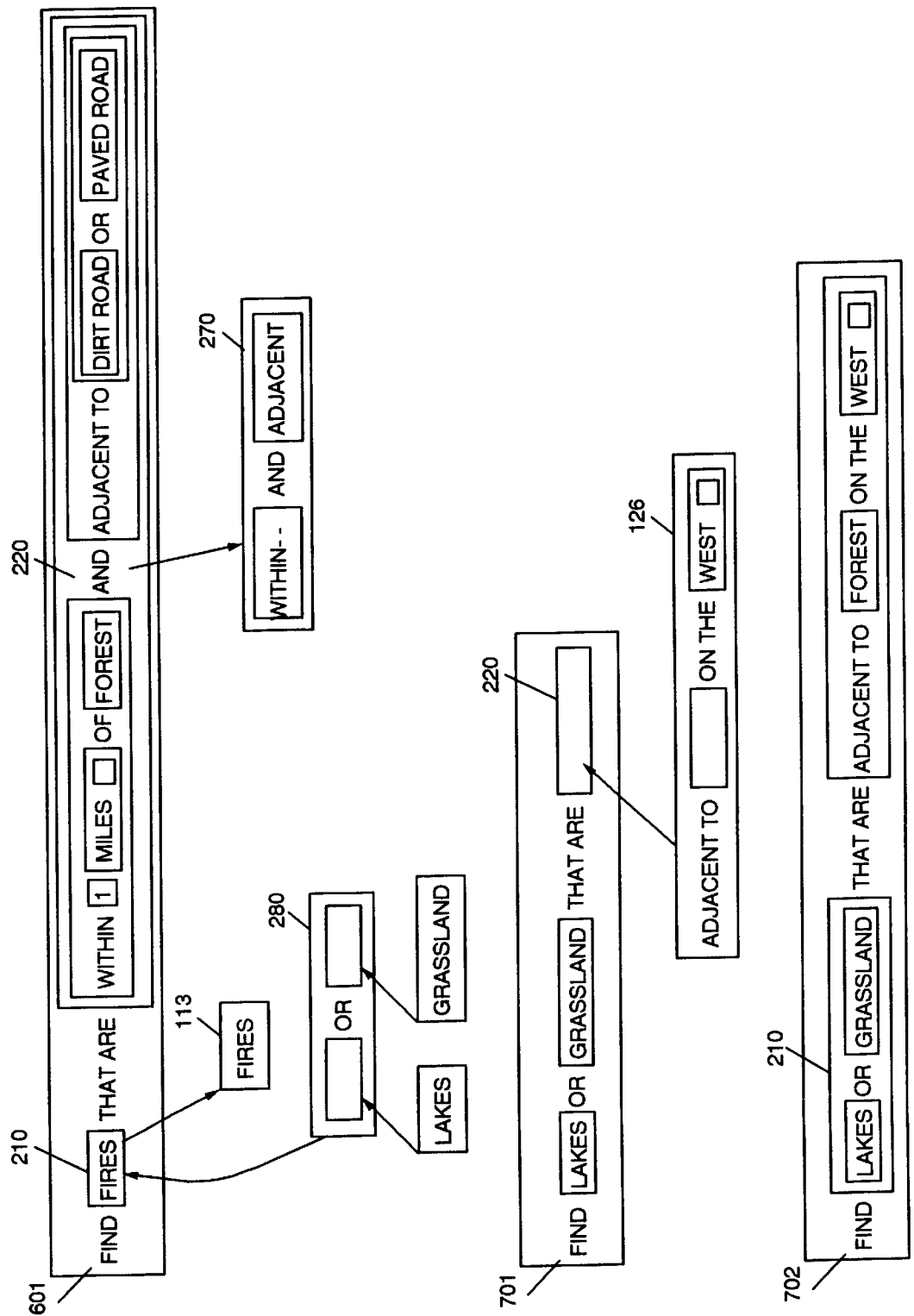

| FIG. 10A |
|---|
| FIG. 10A |

```
Loop
  User performs action:
    case: Select item from menu (mouse down),
          drop onto palette (mouse drag followed by mouse up)
101 {
      Drag item in capsule form (text with colored rectangle);
      On drop, expand item to full phrase template and draw on palette;
    } case: Select item from menu (mouse down),
          drop onto receptacle (mouse drag followed by mouse up)
    {
      Drag item in capsule form (text with colored rectangle), if semantic category of selected item is compatible with semantic
         category of receptacle
      {
        Find expanded size of item;
102     Using size, expand (redraw) parent phrase and its full hierarchy
           of parents;
        Expand item into full phrase template and draw in receptacle;
      }
      else
      {
        Erase capsule form of item (no action);
      }
    } case: Select item on palette (mouse down)
    {
      Mark item selected;
    }
    case: Drag selected item (on palette) onto receptacle
          (mouse drag followed by mouse up);
    {
```

FIG. 10B

103 {
if semantic category of selected item is compatible with semantic category of receptacle
{
  Find size of selected item;
  Using size, expand (redraw) parent phrase and its full hierarchy of parents;
  Draw selected item in receptacle;
}
else
{
  No action;
}
}

104 {
case: Select subphrase from menu within phrase on palette, or click a button on phrase that indicates addition of a particular subphrase
{
  Find size of subphrase to be added;
  Using size, expand (redraw) parent phrase and its full hierarchy of parents;
  Draw subphrase within parent phrase
}

105 {
case: Drag selected item off receptacle (mouse drop followed by mouse up)
{
  Find selected item;
  Move item out of receptacle, draw in new position on palette;
  Resize receptacle to default empty size, draw as blank area;
  Using new receptacle size, shrink (redraw) parent phrase and its full hierarchy of parents;
}

106 {
case: Interact with widget (text area, pull down menu, etc) inside phrase on palette
{
  Process widget interaction;
}

FIG. 10C 107
  case: Press submit button;
  {
    if there is a selected item;
    {
      Initialize output stream;
      Request string representation of selected item:
      {
        if item is a compound phrase (i.e. contains subphrases)
        {
          For each subphrase in item
            {
              Recursively request string representation of subphrase;
            }
        }
        else subphrase is an atomic phrase (e.g. a text item, a widget)
        {
          produce string representation of this subphrase, append to output stream;
        }
      }
    }
    else
    {
      no action;
    }
  }

COMPUTER SYSTEMS, METHOD AND PROGRAM FOR CONSTRUCTING STATEMENTS BY DRAGGING AND DROPPING ICONIC REPRESENTATIONS OF SUBCOMPONENT STATEMENTS ONTO A PHRASE TEMPLATE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to the construction of statements including programs, commands, and queries, and more specifically, to an "easy-to use" graphical user interface that enables a user to construct such statements, and even more specifically, where such statements are query statements for information retrieval.

2. Description of the Related Art

Database system technology is growing in vastness and importance as more and more detailed information is being compiled into accessible databases. Advancements in many technologies including imaging, storage, and database technologies are allowing vast amounts of imagery to be digitized, compiled, and stored in databases. Examples of such digitized imagery include geographic imagery from satellites, imaged documents from vast library collections, and digitized imagery from x-rays. The technology advancements in database management systems is allowing such information to be accessed at optimized speeds and with increasingly more data integrity and reliability. However, all of these advancements in technology do not achieve their full potential usefulness unless everyday novice users can formulate queries to access the vast amount of information in the databases.

Information retrieval is an important aspect of database technology, and the ease of use in retrieving information is critical as more and more information is being retrievable by everyday, non-expert, users. This is becoming even more important as more and more information is being accessible via the internet. Everyday internet users are not necessarily experts in information retrieval. As such, the user interface for composing queries to retrieve information is an important component of database systems and other computer systems that involve information retrieval.

A central goal in user interface design for query systems has been the creation of easy-to-use interfaces that require minimal training. A wide variety of interface styles have been employed including menu-driven, forms-based, natural language, and structured language with automatic completion. Graphical styles have also been employed including: connection diagrams, flowcharts, nested windows, and iconic displays.

In a form based interface, a user fills in the blank fields in the form, and hits submit. Providing a form for a user to fill out makes it difficult to provide flexibility in creating a variety of different queries. It is difficult to take into consideration the number of searchable objects and all of the possible relationships among these objects within a form, thereby limiting the breadth of queries that can be generated from a form. An HTML document on the internet is an example of a form based interface.

In a natural language interface, such as where a user types in free-form English, there is usually not enough guidance that is given to a user. As a result, it is difficult for a user to formulate queries that the database system understands. A user can easily stray outside the vocabulary of the system. In such an unstructured environment, it takes more than a novice user to know what input the computer system can receive and process. The problem with a typical natural language interface is that it does not provide enough guidance to a user.

Although each of the above techniques has its strength, each falls short of the goal of a natural interface that is accessible to both novice and expert users.

"A Knowledge-Based Database Assistant with a Menu-Based Natural Language User-Interface," Xu Wu, IEICE Trans. Inf. & Syst., Vol. E76-D, NO. 10, October 1993, p. 1276+, discloses a query-pattern user-interface where an English-like sentence contains several parentheses such as:

fing[sic] the ( ) of ( ) which ( ) the ( ).

For each blank-phrase, a constraint defines the valid value range. When a user selects the example query pattern to make a query, the system shows the user the available fillers of all blanks. By reviewing the available fillers menu, the user may fill the query pattern and make an English-like query expression as follows:

fing[sic] the (name) of (department) which (located-in) the (London).

The advantage of this query-pattern facility lies in the query-pattern-based guidance facility which is based on the domain concepts model and the contents of the underlying database. However, such an interface with menus is essentially a static interface. It is not possible to build up a complex query from simpler components. In addition, reviewing all available options in a menu in order to fill in the blanks can be time consuming for a user and does not provide sufficient flexibility in constructing a query.

SUMMARY OF THE INVENTION

It is therefore an object of this invention to provide an easy-to-use query interface that has the feel of a natural language interface, but has more structure and gives a user more guidance in constructing the query without sacrificing user flexibility in constructing the query.

It is a further object of this invention to provide an easy-to-use flexible graphical query interface for creating queries with semantic constraints.

The system, method, and program of this invention enables a user to construct a database query by dragging and dropping iconic representations of objects (i.e., query components) onto phrase receptacles within a query phrase template. For example, a query phrase template may be represented as:

Find [ ] that are [ ]; or

Display [ ] as [ ].

"Find" and "Display" are command objects that can be dragged and dropped from a menu onto the display screen palette. The corresponding template is then displayed to the user.

The query phrase template consists of a predefined vocabulary and phrase receptacles. In the example query phrase templates above, the words "that are" and "as" are the predefined vocabulary. The predefined vocabulary can be from a natural language (e.g., English) when formulating a natural English-like query, or it can be from other database query languages such as a structured English query language such as SQL.

A phrase receptacle is a place holder within the query phrase template for the iconic representation of objects that can be selected by the user and dragged and dropped onto the phrase receptacle. Phrase receptacles can also receive values. The phrase receptacles within the query phrase template indicates the portions of the query that the user specifies in constructing the query. The portions of the query that the user specifies may be generally referred to as query options, query variables, or query choices, and are all specified or selected by a user. The phrase receptacles are represented in the above example as "[ ]" in this textual description. On the display screen they are represented as having rectangular or square boundaries.

An entity within a search system or database that is searchable, (i.e., an entity object) is one type of object, i.e., query component, that can be dragged and dropped into a phrase receptacle. For a database comprising geographical imagery from a satellite, the entity objects of the database might consist of the following nouns: fires, lakes, streams, forest, grassland, unpaved roads, and paved roads. As an example, any one of these entity objects could be dragged and dropped onto the first phrase receptacle in the above examples of query phrase templates in constructing a query.

A query sub-expression (i.e., a subphrase template) specifying a relationship among entity objects is another type of object that can be dragged and dropped into a phrase receptacle. A query sub-expression is essentially a query subphrase template because it, also, can have a predefined vocabulary and subphrase receptacles. Query sub-expressions, (i.e., a query subphrase template) that specify a relationship among entity objects might consist of the following: "within", "in", "adjacent", "and", and "or". The following are examples of subphrase templates for each one of these relationships:

within [ ] (units of distance menu) of [ ]

in [ ]

adjacent to [ ] on the (a directional menu)

[ ] and [ ]

[ ] or [ ]

Phrase and subphrase templates can also contain type-in fields or menus or other user interface interactors to provide choices and selections to a user. Subphrase templates and phrase templates are functionally the same.

A nesting of query sub-expressions can be developed by dragging and dropping subphrase templates into subphrase templates. As such, complex queries can be constructed. Because each phrase and subphrase receptacle has a boundary that is graphically displayed, the nesting hierarchy of the query sub-expressions can be visually recognized easily by a user.

Other features of the invention include the following: 1) a phrase receptacle is automatically expanded when a subphrase template is dropped onto it in order to accommodate the subphrase template within the boundaries of the receptacle; 2) a query can be easily modified by dragging objects off of the phrase receptacles that had been previously dropped there, (phrase receptacles resize to their original size when an object is dragged out of it), and by dragging and dropping different objects onto the now empty phrase receptacle; 3) a phrase and subphrase receptacle may have other graphical user interface interactors (e.g., type-in fields, menus, toggle buttons, etc.) in order to guide a user as to the available choices for a given phrase or subphrase receptacle; 4) phrase receptacles can enforce semantic constraints by restricting a type of object or value that can be placed into the receptacle; 5) the phrase templates and subphrase templates can have components that are optional that a user can turn on or off; and 6) the components can be expandable such as by adding another component each time a button is pressed.

Constructing queries by dragging and dropping iconic representations of query components onto a query phrase template provides the following advantages. The user is provided sufficient guidance in the choices and selections that are available in formulating a query and the constraints that exist. The user does not have to generate original phrases or make up entity objects. The user has a choice of objects and a choice of phrases. However, unlike using just menus from which selections are made, the query can be put together in a flexible way by dragging and dropping the selections into and out of the query phrase template. Queries are easy to manipulate because subphrase pieces of a query can be picked up and moved around within a structured query phrase template. Then, once all of the phrase receptacles have been filled, the user has a query sentence that the user can read and understand. In addition, the user can see the structure of the query through a visual nesting of the phrases. The nesting structure is very visual since the objects and subphrases are dropped on phrase receptacles having boundaries that are graphically represented on the display screen. The phrase receptacles are sized appropriately to contain lower ordered, i.e., nested, phrase receptacles. This makes it easy to see the hierarchical order and the relationships among the objects.

In a preferred embodiment, the invention enables a user to construct a structured natural language (e.g., English) query, but the invention is also applicable in formulating SQL queries, other types of queries, or for constructing programs and commands.

BRIEF DESCRIPTION OF THE DRAWING

For a more complete understanding of this invention, reference is now made to the following detailed description of the embodiments as illustrated in the accompanying drawing, wherein:

FIG. 6 illustrates a sequence of events in constructing a query;

FIG. 7 illustrates updating and modifying a previously constructed query;

FIGS. 10A, 10B and 10C illustrate pseudo code for enabling various functions of the invention.

DETAILED DESCRIPTION OF THE PREFERRED EMBODIMENTS

A preferred embodiment of the invention utilizes a drag and drop template to compose a structured natural language (e.g., English) query. The invention is also applicable to building up queries in other natural languages or for database query languages such as SQL. In addition, the invention is applicable to any query, command, or program, i.e., statement, having predefined grammar and structure.

Figure 9:
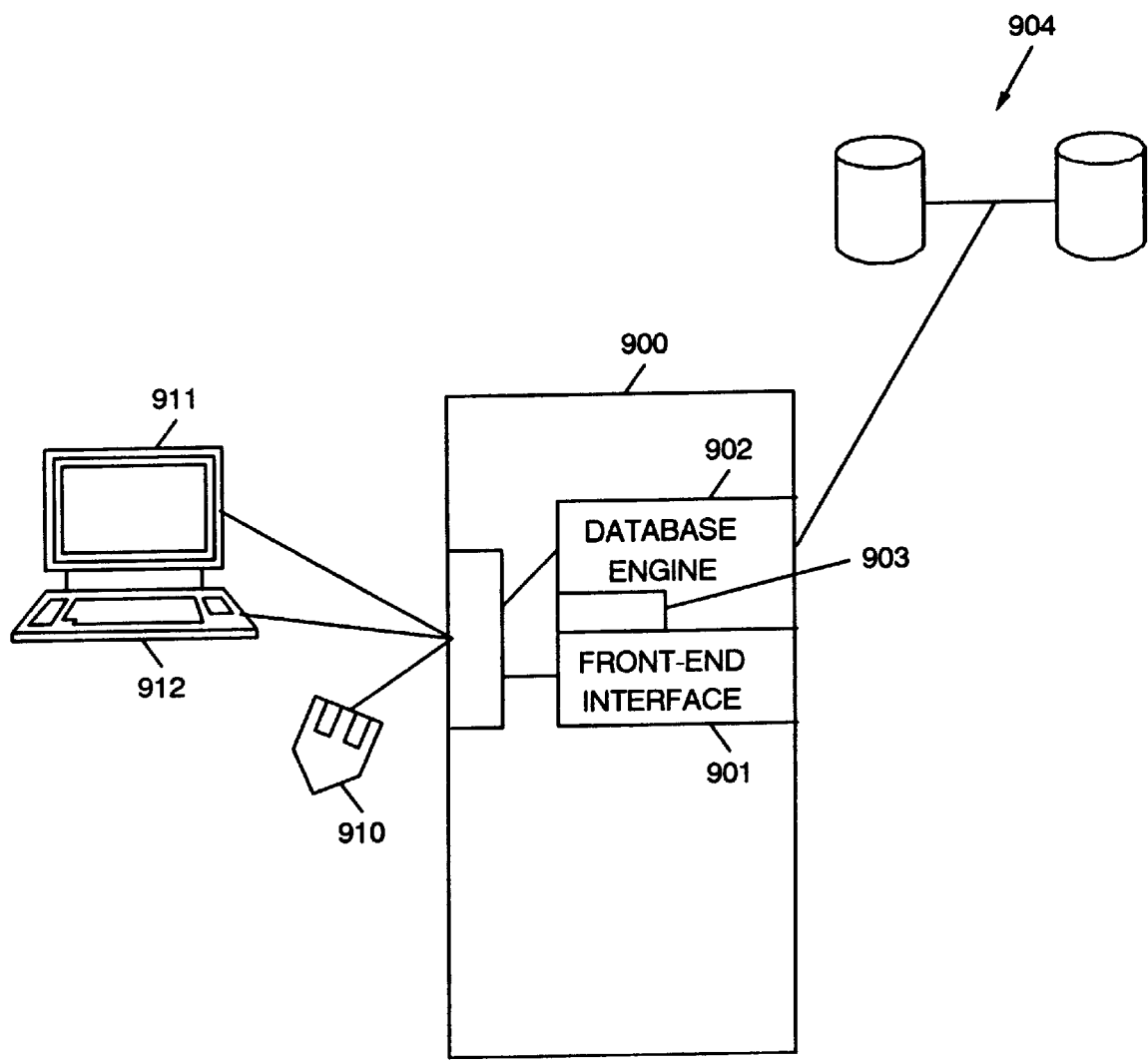
FIG. 9 illustrates the system components in utilizing the invention.

FIG. 9 illustrates the system components in carrying out the invention. A user uses a mouse 910 to drag and drop objects in constructing a query which is displayed to the user on display 911. The mouse 910, and keyboard 912 are also used to provide other types of input. In a preferred embodiment, the invention is embodied in a front end interface 901 to a database engine 902 which returns results to the user from the database 904. However, for other embodiments, the invention could be embodied in a front end interface to a command processor, or a compiler, or other computer component that receives and/or processes statements having predefined grammar and structure.

For the preferred embodiment, depending upon the database being used (e.g., a relational database such as DB2 or a natural language database) and the type of query (e.g., SQL, natural language, etc.) being built, the database engine may either directly use the query, via a query parser, query optimizer, etc., that has been created through the interface, or the database engine may have an additional component that converts the created query into a query representation that can be used by the various components within the database engine. In a preferred embodiment, the front-end interface 901 puts out an encoded form of the constructed query to the query parser 903 within the database engine 902. An example of pseudo code for enabling this function is shown in FIG. 10C at 107. The parser 903 outputs, to the database engine, a set of procedures and requests. However, the interface can be written to construct and output a standard database language such as SQL.

The preferred embodiment of this invention was implemented using Java, a programming language which includes a windowing toolkit for developing applications that run across the internet. However, the invention could be implemented using any programming language that has a windowing toolkit available. The preferred embodiment was implemented using drag and drop widgets along with other standard interface widgets that are available, including choice menus and "type-in" fields. These widgets were incorporated into drag and drop entities. Although Java currently does not supply drag and drop objects as part of the toolkit, other windowing systems do make them available.

The graphical user interface of this invention enables the construction of content based queries. In a content based query, a user is interested in asking questions, i.e., querying the database, based upon the semantics of the domain. For example, for wild-fire detection imaging systems, a user might request to see all of the images that have fires within 5 kilometers of lakes that are larger than 500 square meters. In contrast, a context based query merely requests information based upon a physical organization of the information. For example, in digitized imagery, such a request may be for a certain range of pixels or regions of information. For content-based queries, underlying processing takes place in a search engine to process the request and return results, but the user does not need to be aware of the details of this underlying processing.

The invention will be described with reference to FIGS. 1–7 which show various instances of the user interface displayed to a user. In formulating a query, a user must specify two types of "things", 1) entity objects, which are elements of a database or search system being searched and which are the subject of the query, and, 2) a relationship (which could be spatial, temporal, etc.) among those objects specified.

Figure 1:
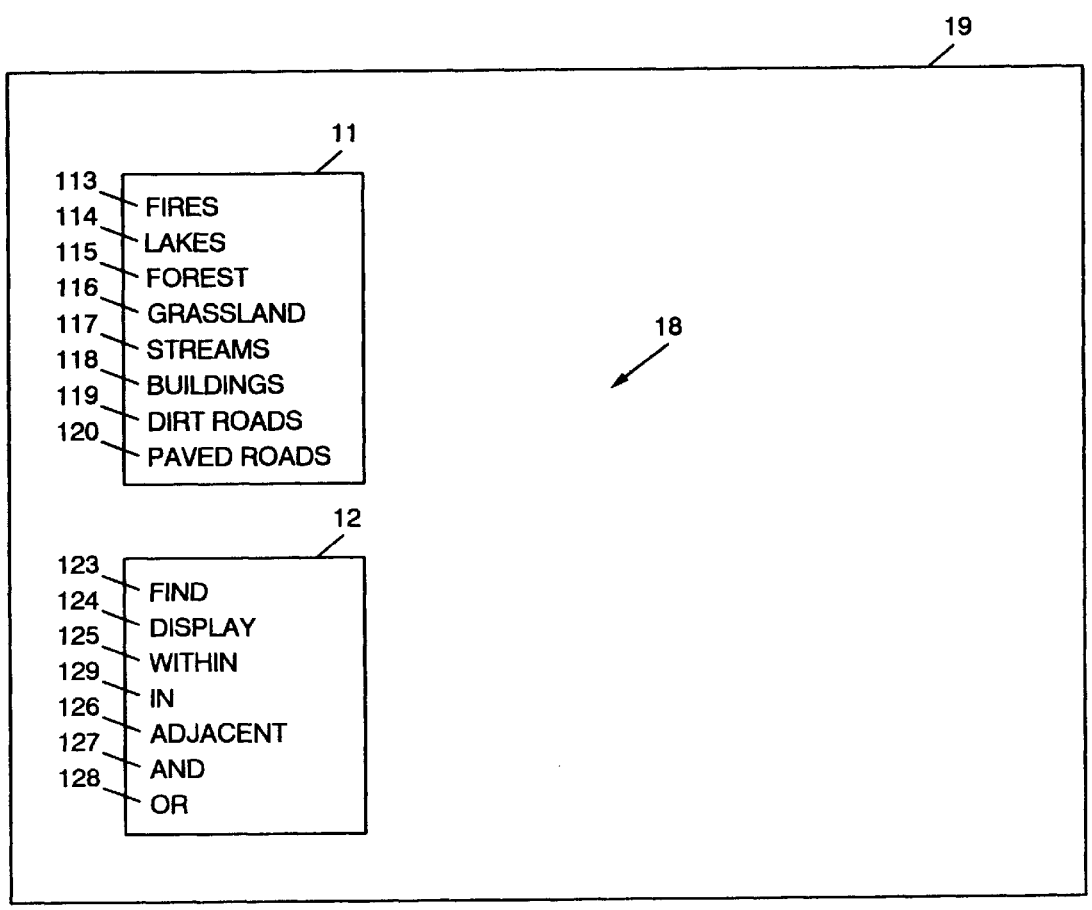
FIG. 1 shows an entity object menu and a command/relationship object menu displayed on a display screen.

As shown in FIG. 1, two object menus are displayed to a user, an entity object menu 11 and a command/relationship object menu 12. The menus consist of iconic representations to allow instances of objects to be dragged and dropped from the menus. The entity object menu 11 contains all of the entities or objects that can be the subject of a query. These objects in the object menu can be statically defined by the administrator who lays out the interface for a specific database, or they can be created dynamically by an interface layout program which queries the database for the kinds of entities that are available. The menu is then built dynamically, i.e., information is fed automatically from the database to create object definitions and to build the menus dynamically. The command/relationship menu 12 contains 1) commands such as "find" or "display" and 2) phrases that specify a relationship among entity objects (e.g., "Within," "Adjacent," "And," "Or," etc.). In addition to the command "Find" which a user can use to specify information to be retrieved, a user can also specify the output format through the command "Display". The objects in these menus merely illustrate a preferred embodiment of the invention. Other entity objects and command/relationship objects may be operative in other embodiments or for other databases or for other search systems. Also, there may be a number of menus, and the types of objects that they store may vary and may not be limited to just entity objects or command/relationship objects, if even those.

When a command is selected from the command/relationship object menu by dragging and dropping one of the command objects onto the display screen palette, a phrase template appears on the display palette. Dragging and dropping is commonly performed with a mouse by clicking on an item in the menu to be selected with a mouse button, dragging it with the mouse button held down, and then dropping it onto the palette by releasing the mouse button. A phrase template typically is comprised of a linear series of widgets such as some predefined vocabulary, some interactors, and one or more phrase receptacles. A phrase receptacle is a place holder for an entity object or a query sub-expression, i.e., a query subphrase. On the screen display it is shown as an empty colored rectangle within a phrase which indicates that it is a location that can accept a drop of an object including other phrases. The phrase template permits development of queries from a predefined vocabulary while automatically imposing syntactic and semantic constraints on the query. In addition, the interface can be made smart enough to know what types of objects can be dropped onto which phrase receptacles. The phrase receptacles can visually indicate to a user which types of objects or phrases can be accepted. This can be indicated by using color, shape, or other visual attribute in the phrase receptacle.

Figure 2:
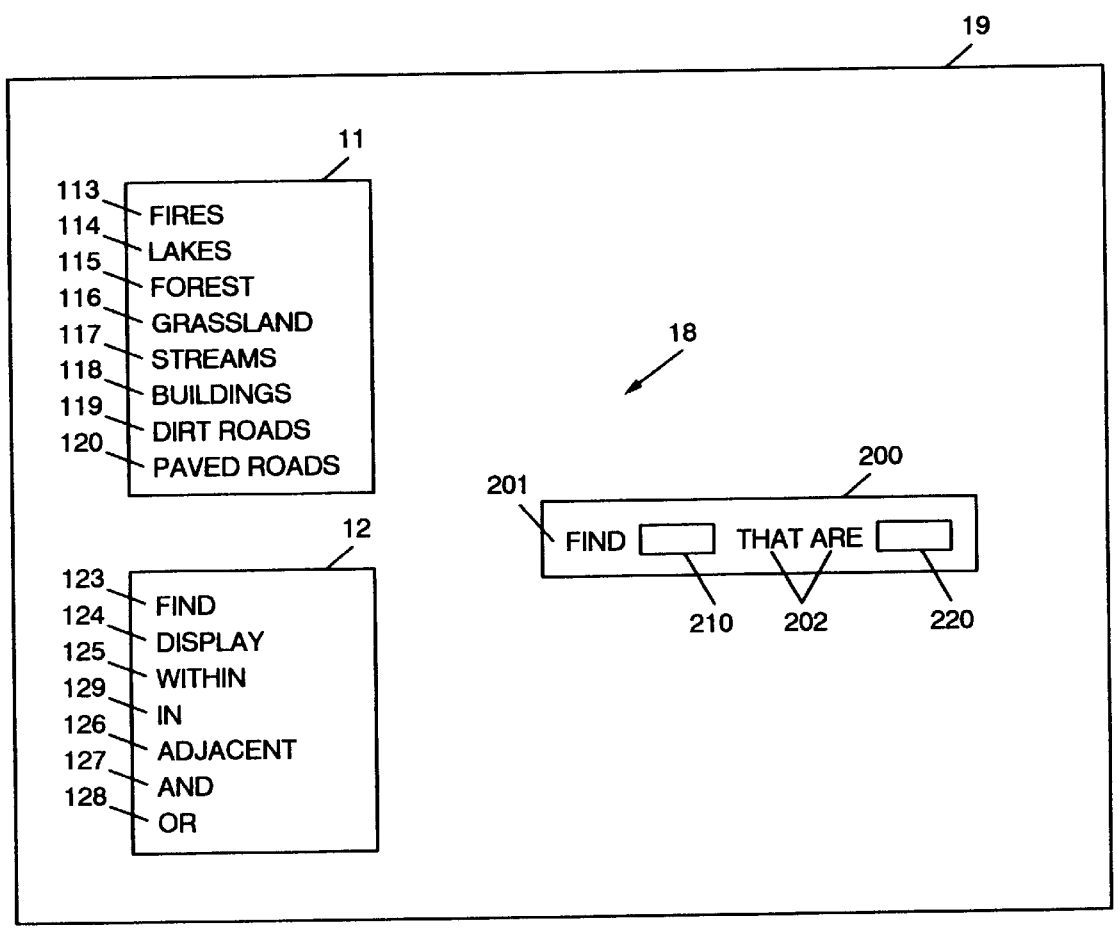
FIG. 2 illustrates a phrase template that has been generated and displayed to a user when a user drags and drops the command object "Find" onto the display screen palette.

For example, as shown in FIG. 2, if a user selects a command such as "Find" 123 from the command/relationship menu 12, and drags and drops it onto display screen (palette) area 18 of display 19, a phrase template 201 is generated and displayed to the user such as "Find" [ ] that are [ ]. Pseudo code illustrating the enablement of this action is shown in FIG. 10A at 101. The phrase receptacles are shown in the textual description herein as "[ ]'s", but are displayed to a user as graphical objects having rectangular and/or square boundaries. On a display, the receptacles may also be highlighted within the boundary with a color or by shading.

In a preferred embodiment, all objects from the entity object menu and the command/relationship menu are dragged and dropped onto their respective areas on the display palette or on a phrase receptacle. For example, "Find" is selected from object menu 12, by clicking with a mouse button, and dragging and dropping the "Find" object onto a blank area 18 (FIG. 1) of the display area. However, other methods could also be used. For example, a light pen could be used instead of a mouse, or a touch screen panel could be used to select and move the objects from the menus. In addition, a user could just type in the command anywhere on the display screen and have the corresponding phrase template appear.

The phrase template 201 is easy to understand for a novice user and accurately reflects possible user queries that are in a structure that are usable by a specific database management system or search system, i.e., information retrieval system. The phrase template 201 comprises the selected command "Find" 123, followed by a blank box 210, followed by the predefined vocabulary phrase "that are", followed by a blank box 220.

The phrase template can automatically enforce semantic constraints. The phrase receptacles can have type restrictions as to what objects can be dropped onto them. Each receptacle can have an associated set of object and/or phrase types that it will accept. The receptacle responds to an object or phrase dragged over (prior to drop) by changing to a highlight color to indicate, that it will accept the drop, or by changing to the background color to indicate that it will not accept the drop. In addition, the user may click on any empty receptacle displayed on the palette and see the phrase and objects that that palette will accept highlighted in the menu boxes. For example, as shown in FIG. 2, box 210 can be restricted to accept an entity object from object menu 11, or the "and" 127 or "or" 128 relationship object. The phrase template will not allow the other objects from the command/ relationship menu 12 to be dropped onto box 210. The phrase receptacles, e.g., boxes 210, 220, can be instructed to restrict the types of phrases and/or vocabulary that they will accept.

Figure 3:
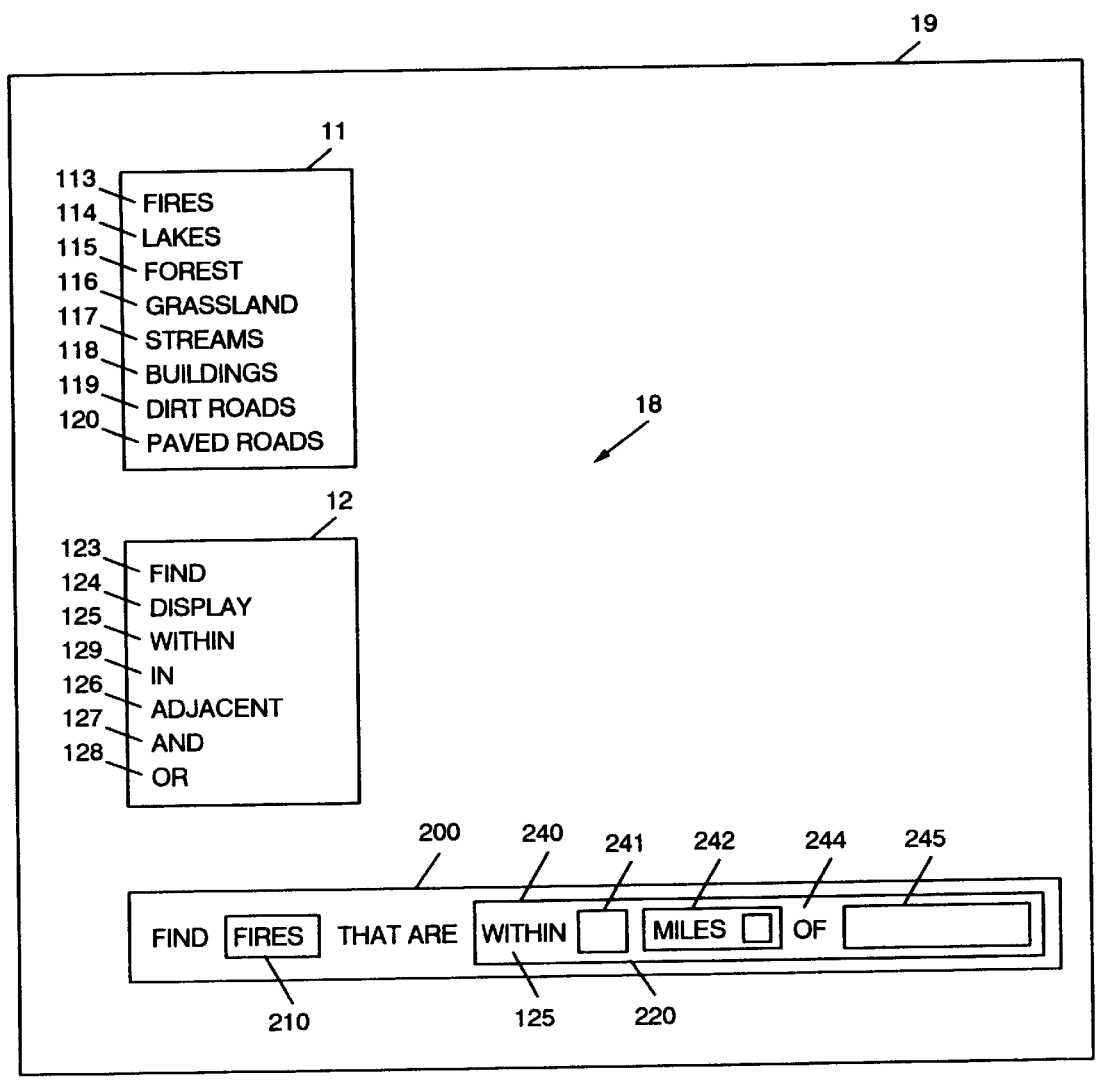
FIG. 3 illustrates filling the phrase receptacles by dragging and dropping objects from menus onto the phrase receptacles.

As shown in FIG. 3, the user has dragged and dropped the object "FIRES" from the object menu 11 into box 210, and has dragged and dropped the object "within" 125 from the command/relationship menu 12. Upon dropping the "within" object 125 onto phrase receptacle 220, the phrase receptacle 220 automatically expands to accommodate the "within" subphrase template 240. An example of pseudo code enabling this is shown in FIG. 10A at 102.

The phrase receptacles physically expand, i.e., box 220 (FIG. 2) is displayed as a longer rectangle in FIG. 3, to incorporate an object that is dropped onto them. Once the object is dropped onto it, the phrase receptacle may expand not only to accommodate the object, but also, possibly, to accommodate another subphrase template, e.g. subphrase 240 (FIG. 3). As such, a phrase receptacle is essentially a place-holder for a subphrase.

The subphrase 240 (FIG. 3) comprises the relationship object "within" 125, followed by a blank box (phrase receptacle) 241, followed by a pop down menu for the appropriate units, followed by the predefined vocabulary word "of" 244, followed by another phrase receptacle 245.

As illustrated and described below with reference to FIG. 3, and FIG. 10B at 106, phrase templates may contain a variety of interactors including type-in-fields, pull down (choice) menus, toggle buttons, add/delete buttons or any other user interface interactor. For example, phrase receptacle 241 within the "within" subphrase 240 is a type-in-field. Again, semantic constraints can be enforced by instructing phrase receptacle 241 not to accept an object that is dragged and dropped over it, and to only accept typed numerical input. Interactor 242 is a pull down menu that allows a user to select the appropriate units of distance. Thus, the invention permits an integration of a variety of graphical user interface techniques in a single query interface in a very natural and seamless way.

Continuing with the subphrase 240 in FIG. 3, the word "of" 244 is part of the predefined vocabulary that is displayed to the user when a "within" 125 relationship is selected from the menu 12. Phrase receptacle 245 is a placeholder for an entity object or perhaps for another subphrase. Again, semantic constraints can be enforced by limiting the type of input received into phrase receptacle 245. For example, phrase receptacle 245 may be restricted in a way as to only accept an entity object from object menu 11 or the "and" 127 or "or" 128 relationship objects, i.e., subphrases.

Figure 4:
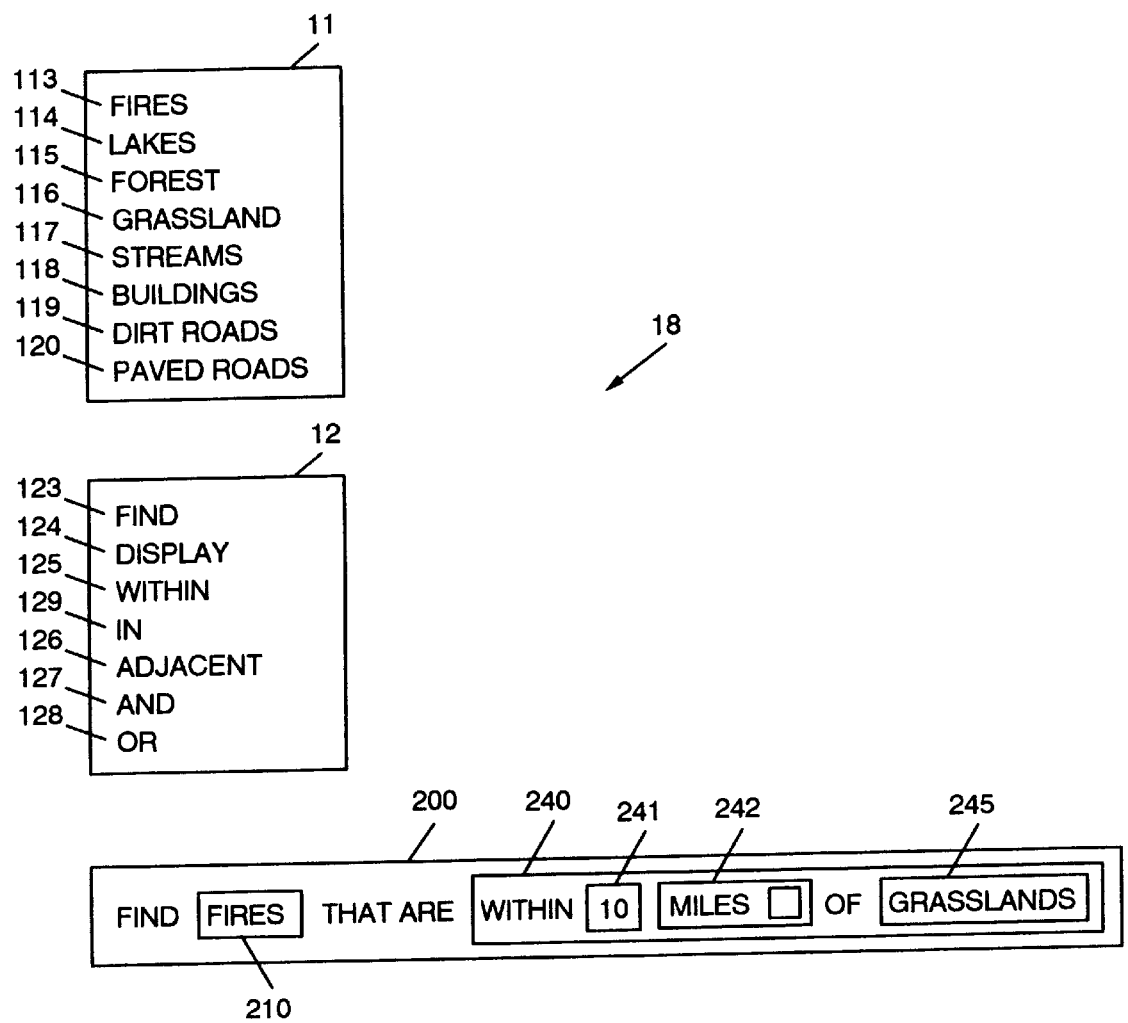
FIG. 4 illustrates a constructed query using the interface of this invention.

FIG. 4 illustrates a final query of FIG. 3 after a numerical value has been typed into phrase receptacle 241, "miles" has been selected from the pull down menu, and object "Grassland" 116 has been dragged and dropped onto phrase receptacle 245.

Figure 5A:
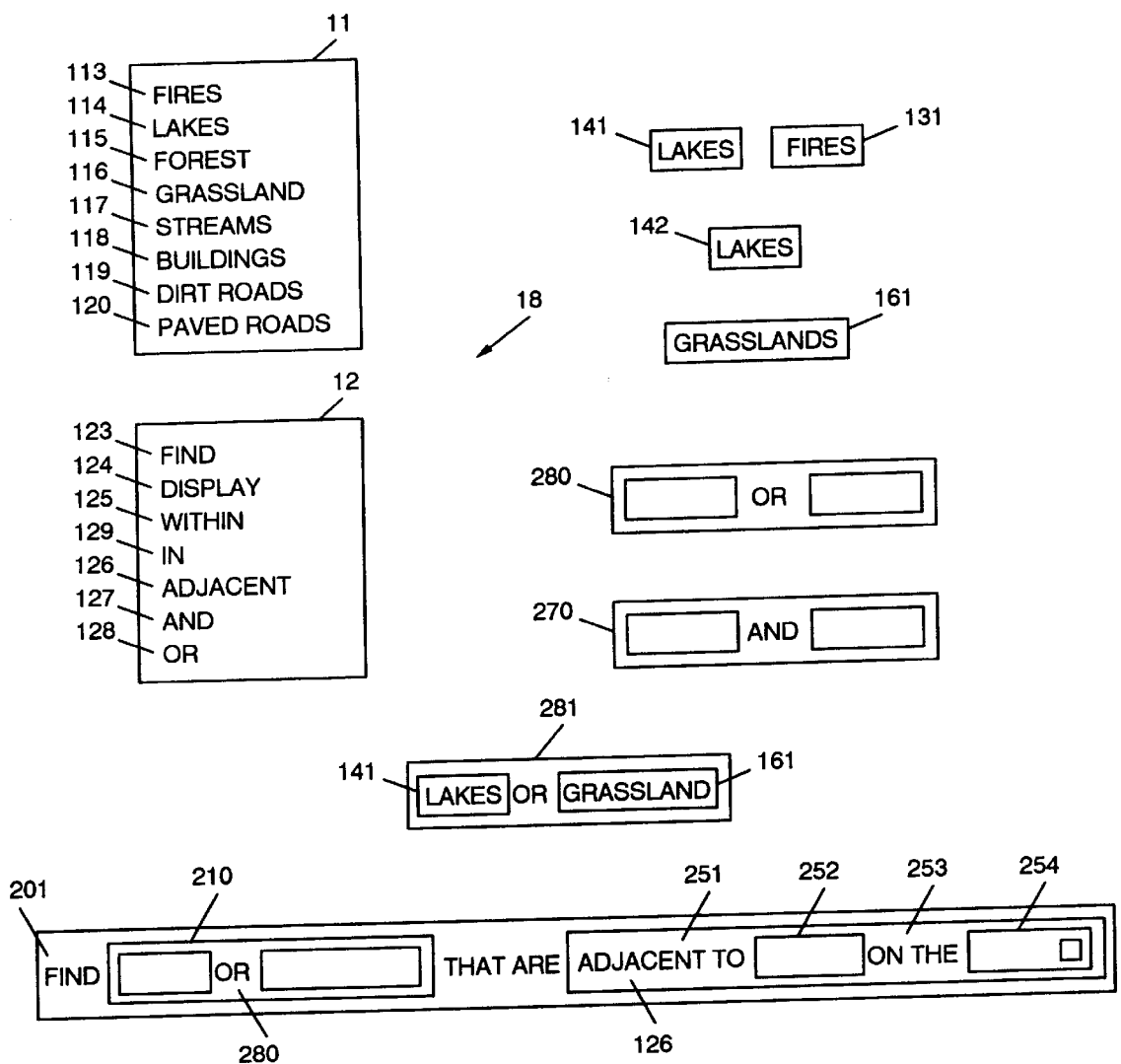
FIGS. 5A and 5B illustrate various techniques that can be employed in building a query.

FIG. 5A illustrates other techniques that can be employed to build a query. Objects can be dragged from a menu and dropped onto the palette (display screen) and then into a receptacle (see FIG. 10A at 103), or dragged from a menu and dropped directly into a receptacle. A user does not have to build up a query all within the primary phrase template. A user can use the display screen/palette to build up subcomponents of the query. For example, various instances 141, 142 of an object 114 from the object menu 11 can be dragged and dropped onto the display area 18. Other objects 113, 116 can be instantiated 131, 161, also. This allows a user to more readily move objects around, combine them, and make revisions to a query by moving an object off of a phrase receptacle and dragging and dropping another object onto it.

In addition, subphrases 280, 270 could be built up independently of the primary phrase template 201 (FIG. 2). It should be noted that although an embodiment is shown here with separate phrase objects, "and" 127 and "or" 128, as choices from the menu 12, in a preferred embodiment there can be just one "and/or" object which is a toggle button for toggling between either "and" or "or".

Again, FIG. 5A illustrates how a phrase receptacle is a place holder for a subphrase. Phase receptacle 210 automatically expands to receive subphrase 280 when subphrase 280 is dragged and dropped onto it. The user can either drag and drop a subphrase instance 280 from the display palette onto a phrase receptacle 210, or the user can drag the relationship object 128 directly from the menu 12. Likewise, the subphrase 280 can be dropped directly onto phrase receptacle 210 or the subphrase 280 can be first completed 281 with objects dropped into it before being dragged and dropped into a phrase receptacle of the primary phrase template 201.

FIG. 5A also illustrates the subphrase template for an "adjacent" 126 relationship object. The subphrase template comprises the "adjacent" 126 relationship object, followed by a predefined vocabulary word "to" 251, followed by a phrase receptacle 252, followed by predefined vocabulary words "on the" 253, followed by a pull down menu for directions 254.

Figure 5B:
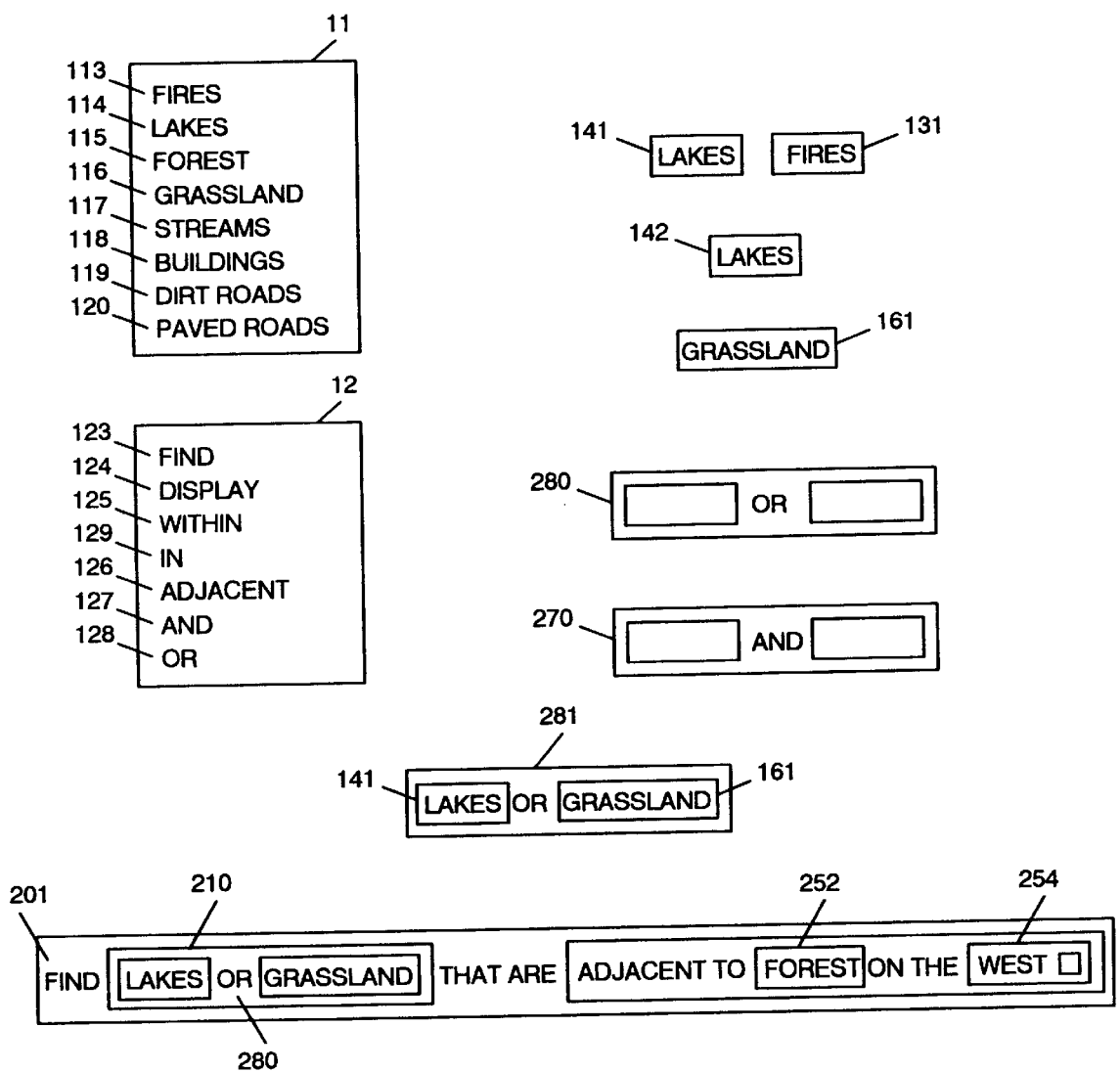

FIG. 5B illustrates the query phrase template of FIG. 5A with the phrase receptacles filled in by dragging and dropping objects 141, 161, 252 or subphrases 280 and making selections from the pull down menu 254. Pull down menu 254 provides selections of directions such as "east", "west", "north", and "south". Other directional indicators such as above, below, right, left, can be added to the menu where appropriate for the specific database.

FIG. 6 illustrates a sequence of building a query with this invention. First a user drags and drops the "Find" object 123 onto the display area 18 (FIG. 1). The phrase template 201 is "[Find [] that are []]". The user then drags and drops the "and" relationship object 127 from menu 12 into phrase receptacle 220 of phrase template 201. The phrase template 201 then becomes phrase template 301 "[Find [] that are [[] and []]]." The "Fire" object 113 is dragged and dropped onto phrase receptacle 210, the "within" relationship object 125 is dragged and dropped onto phrase receptacle 327 of the "and" object 127, and the adjacent relationship object 126 is dragged and dropped onto phrase receptacle 427 of the "and" relationship object 127.

The phrase template 401 then becomes "[Find" [Fires] that are [[within [] [miles] of []] and [adjacent to [] on the [west] ]]]. Since the user wants to use "adjacent" without the additional directional qualifier, the last part of the adjacent object 126 can be deleted. The user can type in "1" into phrase receptacle 241, select "miles" on the pull down menu 242, and drag and drop the "forest" object 115 onto phrase receptacle 245. The phrase template 501 becomes [Find [fires] that are [[within [1] [miles] of [forest]] and [adjacent to []]]].

In phrase receptacle 252 of phrase template 501, the user can drag and drop the "or" relationship object 128. If "dirt road" object 119 and "paved road" object 120 are dragged and dropped onto the phrase receptacles of the "or" object 128 that was dragged and dropped onto phrase receptacle 252, the query 601 becomes [Find [fires] that are [[within [1][miles] of [forest]] and [adjacent to [[dirt road] or [paved road]]]]].

As shown in FIG. 6, the query interface of this invention automatically displays both the full natural (e.g., English) language query at all times, as well as the subphrase structure of the query through the use of nested panels. The nested structure of the query 601 can be shown via panel boundary 200 surrounding the primary phrase template 201, panel boundary 300 surrounding phrase receptacle 220 in the primary phrase receptacle 201, panel boundary 400 surrounding the subphrase for the "within" object 125, panel boundary 500 surrounding the subphrase receptacle for the "adjacent" object 126, and panel boundary 600 surrounding the "or" subphrase object 128. The nesting is as follows: 1) panel boundary 600 is within panel boundary 500, 2) panel boundary 500 and 400 are within panel boundary 300, and 3) panel boundary 300 is within panel boundary 200.

A user can physically see the structure of the query. Since, the structure visually reveals the subcomponents of the query, a user can select subcomponents of the query and drag them off of the query phrase template. The boundary lines are made bold when a subcomponent has been selected to indicate to the user which nested subcomponent has been selected, and, therefore, which one will be moved (dragged around) by the user interaction. Portions of the query can be changed at any level, and the nested lines indicate to the user what object/phrase is being operated on.

When a receptacle receives a drop, it expands to the size of the component being dropped, and triggers a resize of the enclosing phrase. Likewise, when an object or phrase is dragged off of a receptacle, the receptacle is reduced to its initial size. When there are multiple nested subphrases, all resize operations apply to all appropriate levels of the nesting.

Query 601 can be updated or modified by deleting objects within the query (such as by dragging and dropping the object off of the phrase template or selecting the object and hitting the delete key, or by any other deleting technique) and dragging and dropping new objects onto the phrase receptacle that has now become empty once an object has been deleted from it. When an object is dragged off of a receptacle, the receptacle becomes blank, i.e., empty, resizes to its default size, and is available to receive another object, as shown in the pseudo code in FIG. 10B at 105.

For example, with reference to FIG. 7, the "fires" object 113 can be dragged off of phrase receptacle 210. When a phrase or object is dragged off of a phrase receptacle, the boundary of the phrase receptacle is made bold or highlighted (or some other graphical indication is given) to indicate to the user which nested phrase receptacle is the subject of being moved. Since each subphrase has a surrounding rectangle, the user can readily select a subphrase at any level from a nested set, and drag it off of its enclosing phrase. When a subphrase has been dragged completely off of the receptacle, the receptacle returns to its empty appearance, and the enclosing phrase(s) resizes appropriately. An "or" object 280 that has been moved onto the display area 18 or an "or" object 128 that is still resident within the menu 12 can be moved into the now empty phrase receptacle 210. The phrase receptacles of the "or" object can be populated with objects either before or after the "or" object is dragged and dropped onto phrase receptacle 210. Likewise the "and" object 270 can be selected to be dragged off of phrase receptacle 220. The boundary 300 is made bold to indicate the nested object that is the subject of being dragged. After these changes and modifications to the query by the user, the phrase template becomes the phrase template 701 in FIG. 7. The user can now select a different object to drag onto, i.e., populate, phrase receptacle 220. As shown in FIG. 7, the user has selected an "adjacent" object 126. Phrase template 702 shows the completed updated query that a user has created by modifying a previously created query. As such, the query interface supports natural update of queries by selection and deletion of subphrases followed by the replacement with new subphrases by using drag and drop operations.

The system, method, and program of this invention enables the construction of queries while also enabling the user to view directly the query that has been constructed. There is no disconnection between the query construction process and what the final query looks like. The query is not constructed in one window of the display screen while the results appear in another window as in other query systems. Instead, in the preferred embodiment, the query construction process and the final query results appear in the same window. In addition, the query can be read as a natural-language sentence from left to right.

In one embodiment, the user can create several queries at the same time. There may be a palette (display screen or window) full of multiple queries with these multiple queries available to be sent to the database engine. Buttons are also available that will delete the selected phrase from the palette, or delete all phrases from the palette. In addition, any given query can be copied or duplicated on the display screen using cut and paste, or copy, or other editing functions in order for the user to create a subsequent query from a previously created query without having to redo the complete creation of the query and without eliminating or deleting the original query. This allows multiple queries that may have only slight variations in them to be more efficiently created.

However, any given query displayed is not sent to be executed until the user specifies that it should be. Once a complete query phrase has been constructed, the user can submit it by selecting the phrase (clicking the mouse over it), and then clicking on a "submit" button. This causes the selected phrase to convert to text form and transmit to the query engine. Query sentences are submitted to the search engine as a set of nested function calls.

Figure 8:
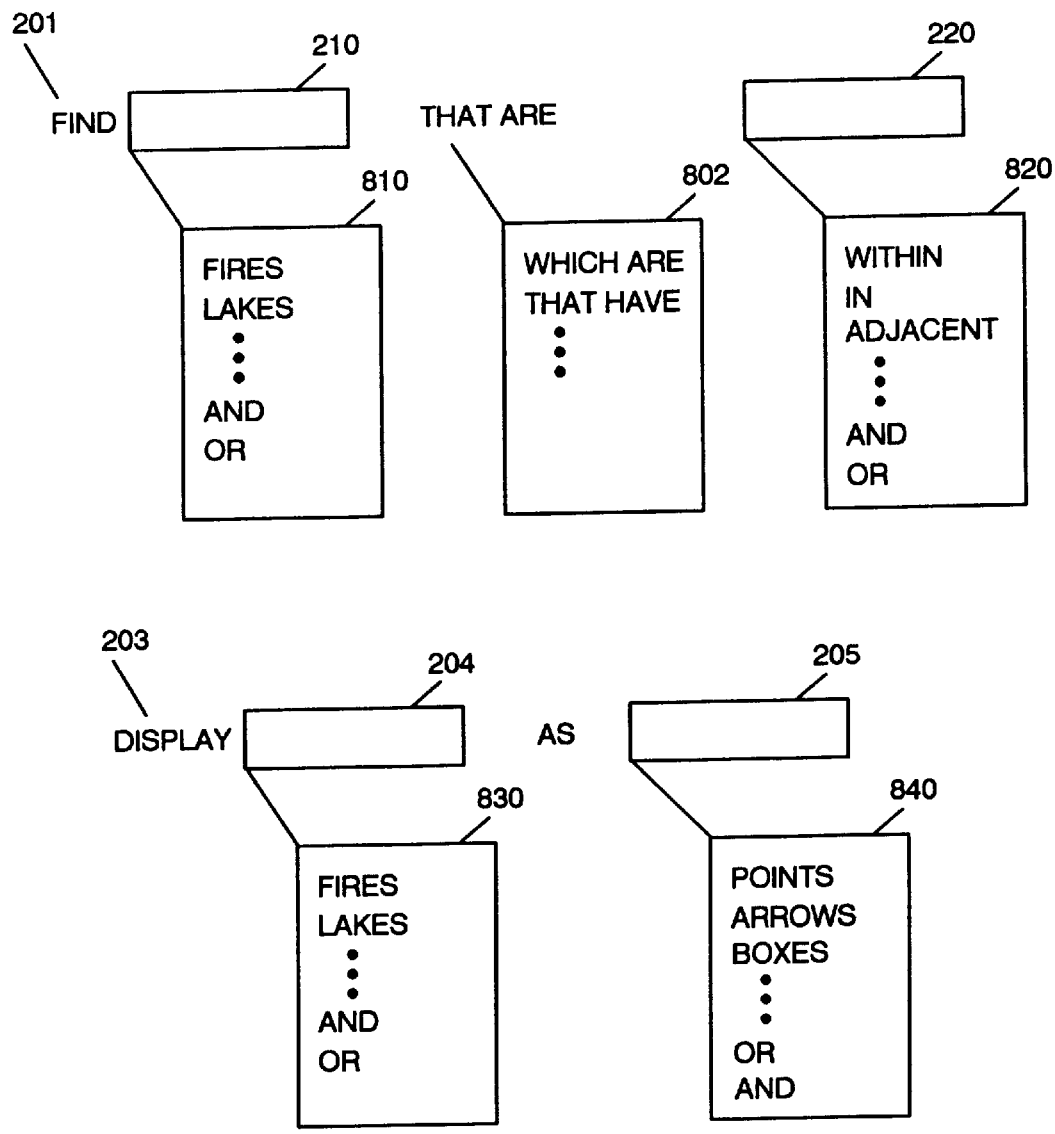
FIG. 8 illustrates another embodiment of the invention where the object menus are embedded within the phrase receptacles.

In the embodiment described above, the entity objects and command/relationship objects were displayed in menus 11, 12 on the screen from which a user drags the objects. In another embodiment, some or all of the entity objects and command/relationship objects (including the phrases and subphrases with their respective phrase receptacles) can be embedded within a primary phrase template in a pull down menu. For example, there may be two phrase templates 201, 203 as follows: 1) Find [] that are [], and 2) Display [] as []. As shown in FIG. 8, the phrase receptacles 210, 220, 204, 205 have pull down menus 810, 820, 830, 840 that appear when selected. The subphrase or object can then be selected by being dragged and dropped from the menus. (See the implementing pseudo code in FIG. 10B at 104). The pull down menu is just one-type of interactor that can be used for this. Other interactors can also be used. In addition, a phrase template can have multiple clauses in any different position within the template. Also, there may be a set of predefined vocabulary choices to pick from. For example, after "Find [ ]", there may be a pull down menu 802 that says "which are", "that have", or several other possibilities to choose from in order to build up the query.

In addition, the phrase and subphrase templates can have components that are optional that a user can turn on or turn off or collapse. For example, in phrase template 201 (FIG. 2) a user could turn off or collapse the "that are [ ]" components in order to construct a query for finding all "fires".

Figure 11:
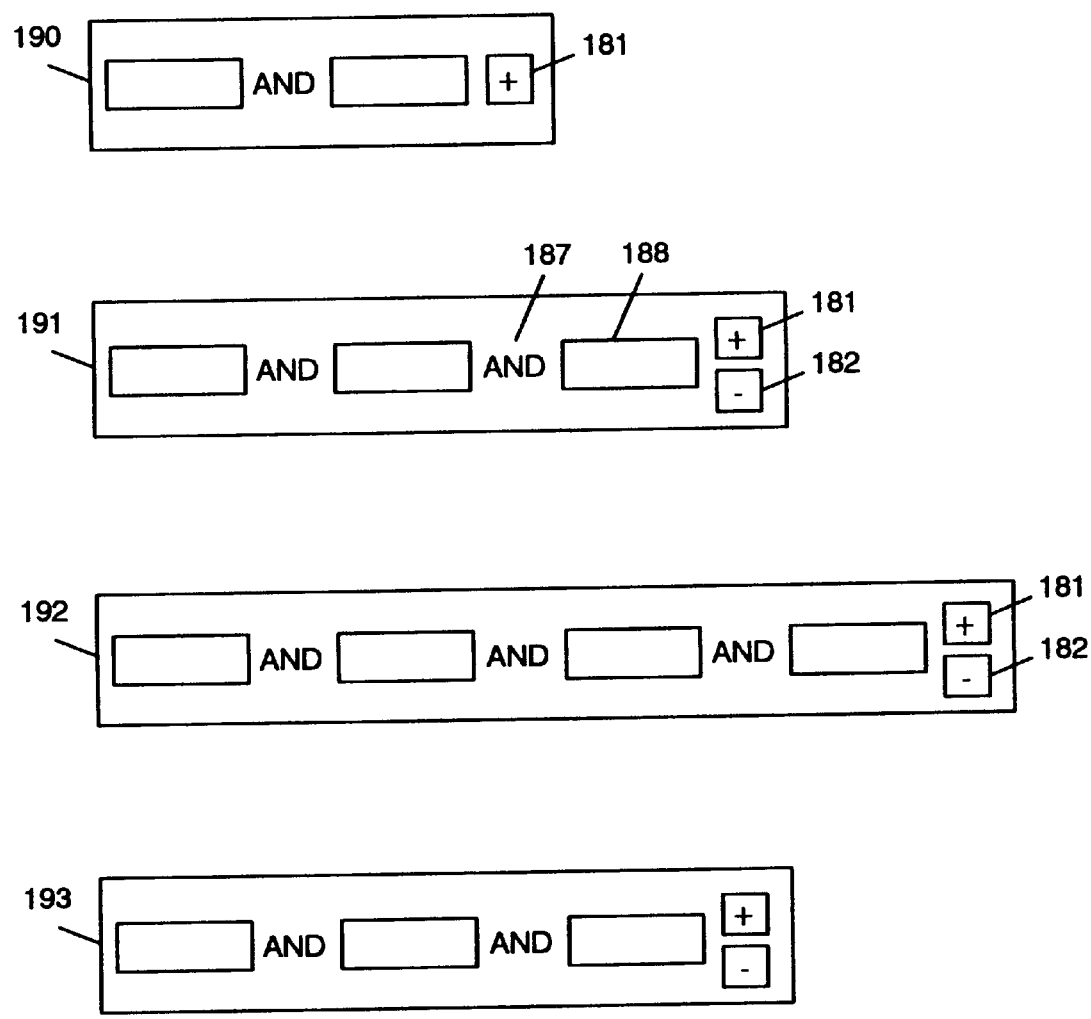
FIG. 11 illustrates expanding and contracting phrases through "add/delete" buttons.

With reference to FIG. 11, add/delete buttons are special widgets that allow phrases to expand to hold an arbitrary number of predefined widget sets. In a preferred embodiment, the widget is initially displayed as an "add" button containing the +symbol 181 (FIG. 11). When the button is pressed, a set of widgets is added to the panel, and the button changes to a pair of buttons— an "add" button (containing the +symbol) 181 and a "delete" button (containing the −symbol) 182. Phrase 191 shows the result of pressing the add button 181 in phrase 190. An "and/or" toggle button (shown here as toggled to "and") 187 and a receptacle 188 have been added to the phrase panel. Each press of the add button 181 will cause an additional set of widgets to be added as shown in phrase 192. Pressing the delete button 182 in phrase 192 causes the rightmost set of widgets associated with the button to be removed from the panel as shown in phrase 193. If all widget sets are deleted, the add/delete widget reverts to a single add button as shown in phrase 190. The series of widgets (predefined vocabulary, receptacles, interactors) that are added or deleted can be any number of such widgets and of any such type. However, for a particular add/delete button the number and type of widget to be added or deleted is fixed, and it is the same for the "add" button or "delete" button.

The add/delete button allows a linear, un-nested set of subphrases to be added to a phrase. This is desirable when an arbitrary sized set of objects or phrases of the same type is to be constructed. No precedence is imposed by the user on such a set; the query processor (on the server) typically employs a left-to-right precedence such as (((A AND B) OR C) AND D). If a different ordering of operations is required, the user can drop phrases into receptacles to build up an appropriately nested structure, such as (( A AND B) OR (C AND D)) in lieu of using add/delete buttons. Each of the subphrases would have its own add/delete button allowing each to be expanded.

As a result, alternate syntaxes and optional additional subphrases can be supported by means of interactors within a phrase template that can cause phrases to expand, contract, or change their layout. The phrase and subphrase templates are dynamic forms that can have any type of graphical interactors, type in fields, pull down menus, icons, or any other kind of graphical interface object that is needed within the phrases.

Implementation

A preferred embodiment of the invention is an internet-based system employing the interface implemented in java. A definition file defining the set of menu boxes, objects and phrases is served from the server that sends the applet to the browser. Submitting a query results in sending an HTTP message to the server containing a text form of the query.

The definition file is a simple description of the objects, phrases, and menu boxes, as well as a description of the constraints for each receptacle. The file has two main types of blocks. The "Definition" block contains a set of definitions of phrases and objects (including constraints). Each phrase and object definition defines a name for the entity being defined the "List" block uses these names to define a menu box.

Within the definition block, a "definePhrase" statement describes a single phrase. The statement defines a name and a text label for the phrase followed by a list of one or more "types" for the phrase. These types may be used in constrain statements described below. Following this header is a set of one or more widget definition statements. Each widget definition contains a widget type, a name, a text label, and a set of widget-dependent parameters. These parameters include information such as item labels for a pull down menu, background color for a receptacle, and initial text for a type-in field. Similarly, objects within a "defineObject" statement are described by a name, a text label, and a list of types.

"Constrain" statements are used to define the types of entities that receptacles will accept. Each constraint statement contains the name of the phrase being constrained followed by a set of one or more receptacle names within that phrase. For each receptacle name, the list of types that the receptacle will accept is specified. In the example below, the receptacle "find_list" in the phrase "Find" will accept entities of type "area_object" or "object_list". There are two objects of type "area_object", Fires, and Agri (and none of type "object_list"); either of these will be accepted by the "find_list" receptacle.

These definition files allow a good deal of flexibility in creating an interface. Definition files may be defined in advance and served to the client on request. Alternately, the definition files may be created on the fly by a server application, for example, a database access program. This allows the server to dynamically construct an interface that contains, for example, lists of database objects and relationships between them.

Query string generation is accomplished by recursive message passing from a phrase to each of its components. The message passed is "print yourself to an output stream". Phrases print themselves by printing the name of the phrase, and then invoking the print method for each widget they contain. Text widgets may have a print string specified, or they may print nothing (null in the definition file). Type-in fields print the value in the typing area. Pull down menus print the string in the current menu choice, as do toggle buttons. Receptacles pass the print message to the phrase or object that they contain. If the receptacle is empty, nothing is printed. In an embodiment of the invention there can be a flag in the receptacle specification that indicates whether or not it is optional. If not, the receptacle must be filled for a query to submit, otherwise an error message will be generated. A special widget type, "Delimiter" in the definition file is used to provide additional syntax for the query string generation. In the sample file, delimiters are used to create enclosing parentheses for the Find phrase.

Example file

---

```
Definitions
{
defineObject Fires : Fires : ( area_object )
defineObject Agri : "Agricultural area" : ( area_object ,
         land_cover_type)
definePhrase Find " Find " ( sentence )
    (
    Text : find : Find : null
    Delimiter : "("
         Receptacle " find_list " yellow
         Text : that_are : "that are" : null
         Receptacle : rec_condition : yellow
    Text : display : ", display as" : null
         Choice: display_type : ( "rectangles", "points")
    Delimiter : ")"
    )
definePhrase WithinDistance : "Within distance" : ( condition )
    ( Text : Within : "within" : null
      Type-in : distance : "0"
      Choice : units : ( Kilometers, Miles, Furlongs, Meters )
      Text : of : of : null
      Receptacle : within_object : yellow
    )
constrain Find
    ( find_list : ( area_object , object_list )
      rec_condition : condition
    )
constrain WithinDistance
    ( within_object : ( area_object , object_list )
    )
}
List : objects : "Objects"
{
  Fires
  Agri
}
List : Phrases : "Phrase templates"
{
  Find
  WithinDistance
}
         Copyright IBM Corporation 1996
```
---

The invention has been described above with reference to a preferred embodiment. The query interface of this invention also applies naturally to constructing english query languages such as SQL.

In implementing an SQL interface, the user is initially presented with a set of table names extracted from the database. The user selects as many of these tables as desired, and then clicks a "generate" button to create a user interface. The server program queries the database for column names of these tables and builds object definitions for them. A predefined set of phrases is added to these dynamic object definitions, and the interface definition returned to the client. The user can now build SQL queries using the interface.

For example, a SQL query such as:
SELECT name, employee_id FROM salary_table WHERE salary<20000
would be built from the following SELECT phrase template:
SELECT [receptacle 1] FROM [receptacle 2] WHERE [receptacle 3]

The interface would enable "[receptacle 1]" to be expandable to allow additional phrases to be added to specify multiple output fields. When expanded to two entries, fields "name" and "employee_id" would be dragged from a list of fields and dropped into the expanded receptacle. A list of table names could be used to drag and drop a table name into "[receptacle 2]". A user could fill "[receptacle 3] with a phrase from a list of relations that expands to:

[receptacle 4]<<type in field>

The less than sign "<" could be a toggle button with values B<,>, <=, >, =". A user could fill "[receptacle 4]" from the list of fields, and the user could type the value 20000 into the <type in. field>.

The interface of this invention also applies naturally to computer commands or programs. Commands can be presented as structured English. For example, a command for moving files might look like:

move [receptacle 1] to location [receptacle 2]

[receptacle 1] would accept the name of a file selected from a menu, and [receptacle 2] would accept the name of a directory also selected from a menu.

Computer programs could also be constructed using these techniques. For example, in an interface for the C programming language, a high level phrase might be available looking like:

---

```
         [receptacle 1]
         {
            [receptacle 2]
            add/delete button
         }
```
---

[receptacle 1] would accept certain types of program statements, such as IF and FOR, each of which would consist of phrase templates. [receptacle 2] would accept a number of types of program statements, including the one shown above. The add/delete button would allow for a sequence of statements to be constructed.

The IF statement might look like:

IF [receptacle 1] THEN [receptacle 2] ELSE [receptacle 3]

where each of these receptacles will accept either conditions (receptacle 1) or statements (receptacle 3).

It should be noted that the program interface has a vertical component to its layout as well as the horizontal component previously described. Phrases and phrase receptacles can expand in either dimension.

As illustrated from the above description of the invention, the interface of this invention allows a user to construct statements—queries, programs, and commands—in a number of possible sequences. One way of putting a statement together is by starting with the top level statement phrase (sentence), filling in components within that phrase, then filling in the components for each subphrase, etc. This approach requires planning the course of the statement construction from the start. This is a structural approach to query construction, in which the user focuses on the clauses of the query prior to selecting the objects that contribute to those clauses.

Although this approach may be natural to some users, many users may find a statement construction style that focuses on objects and builds up predicates in a "bottom-up" fashion much more natural. This bottom-up approach is a natural style for many users. It allows the users to focus on objects and relationships, deferring structural decisions until later in the construction process. In other words, the user begins with "what" and focuses later on "how".

Using the foregoing specification, the invention may be implemented as a machine, process, or article of manufacture using standard programming and/or engineering techniques using computer programming software, firmware, hardware or any combination or subcombination thereof.

Any such resulting program(s), having computer readable program code, may be embodied within one or more computer usable media such as memory devices or transmitting devices, thereby making a computer program product, i.e., an article of manufacture, according to the invention. Memory devices include, but are not limited to, fixed (hard) drives, disks, diskettes, optical disks, magnetic tape, semiconductor memories such as ROM, Proms, etc., or any other memory device. Transmitting devices include, but are not limited to, the internet, electronic bulletin board and message/note exchange, telephone/modem based network communication, hard-wired/cabled communication network, cellular communication, radio wave communication, satellite communication, and other stationary or mobile network systems/communication links.

A machine embodying the invention may involve one or more processing systems including, but not limited to, cpu, memory, storage devices, communication links, communication/transmitting devices, servers, I/O devices, or any subcomponents or individual parts of one or more processing systems, including software, firmware, hardware or any combination or subcombination thereof, which embody the invention as set forth in the claims.

Making, using, or selling a machine, process, or article of manufacture embodying the invention may involve one or more of the following: executing program code directly from one medium, storing program code onto a medium, copying the code from one medium to another medium, or transmitting the code using a transmitting device. Each one of these may involve the use of a memory or transmitting device which only embodies program code transitorily as a preliminary or final step in making, using or selling the invention.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention.

While the preferred embodiment of the present invention has been illustrated in detail, it should be apparent that modifications and adaptations to that embodiment may occur to one skilled in the art without departing from the spirit or scope of the present invention as set forth in the following claims. For example, some modifications and adaptations may include the following:

user input may be received from the keyboard, mouse, pen, voice, touch screen, or any other means by which a human can input data to a computer, including through other programs such as application programs; and the user interface of this invention is applicable and adaptable to any statement having predefined grammar and structure such as programs, commands, queries; and is applicable to any compiler, processor, database, bibliographic system, digital library, information retrieval system, or as a front-end for an internet/web search system.

We claim:

1. A computer system for enabling a construction of a statement by a user through a user interface, the computer system comprising:

means for displaying a subphrase template, the subphrase template having at least one subphrase receptacle, the subphrase receptacle indicating a place-holder for a selectable object;

means for displaying a phrase template for the statement, the phrase template having predefined vocabulary of the statement and at least one phrase receptacle, the phrase receptacle indicating a place-holder for a selectable object defining a choice for the statement;

means for accepting a selectable object within the phrase receptacle in response to a user dragging and dropping the selectable object onto the phrase receptacle from one of a menu of selectable objects and the subphrase template;

means for expanding the phrase receptacle to incorporate the subphrase template when the subphrase template is dragged and dropped onto the phrase receptacle; and means for displaying a constructed statement having the predefined vocabulary and the choice.

2. The computer system of claim 1 wherein the statement is a query.

3. The computer system of claim 1 wherein the statement is a program.

4. The computer system of claim 1 wherein the statement is a command.

5. The computer system of claim 2 wherein the predefined vocabulary is a natural language.

6. The computer system of claim 2 wherein the predefined vocabulary is a SQL language.

7. The computer system of claim 2 wherein the selectable object is a searchable entity object.

8. The computer system of 1 further comprising means for enabling a modification of the constructed statement by allowing a selection and deletion of the selectable object within the phrase receptacle and accepting a second selectable object within the phrase receptacle.

9. The computer system of claim 8 wherein the means for enabling the modification further comprises:

means for deleting from the phrase template, a phrase receptacle selected by the user to allow the user to use a portion of the phrase without a deleted qualifier.

10. The computer system of claim 1 wherein at least one of the at least one phrase receptacle or subphrase receptacle has a graphical user interface interactor.

11. The computer system of claim 10 wherein the graphical user interface interactor is a type-in field.

12. The computer system of claim 10 wherein the graphical user interface interactor is a menu.

13. The computer system of claim 10 wherein the graphical user interface interactor is a toggle button.

14. The computer system of claim 1 further comprising means for enforcing constraints by restricting a type of selectable object that is accepted in at least one of the at least one phrase receptacle or subphrase receptacle.

15. The computer system of claim 1 wherein each phrase receptacle and subphrase receptacle has a graphical boundary representation, and wherein the means for displaying a constructed query displays a subphrase structure of the query through a visual nesting of the graphical boundary representations.

16. The computer system of claim 1 further comprising means for adding an un-nested set of subphrases to the phrase template or subphrase template.

17. The computer system of claim 16 further comprising means for deleting the added set of subphrases.

18. The computer system of claim 16 or claim 17 wherein the means for adding and means for deleting is achieved through an add/delete button.

19. The system of claim 1 wherein the predefined vocabulary is in a computer language.

20. A computerized method for constructing a statement, the method comprising:

displaying a subphrase template, the subphrase template having at least one subphrase receptacle, the subphrase receptacle indicating a place-holder for a selectable object;

displaying a phrase template for the statement, the phrase template having predefined vocabulary of the statement and at least one phrase receptacle;

accepting, for each separate phrase receptacle, a selectable object within each phrase receptacle in response to a selection by the user by dragging and dropping the selectable object onto the phrase receptacle from one of a menu of selectable objects and the subphrase template;

expanding the phrase receptacle to incorporate the subphrase template when the subphrase template is dragged and dropped onto the phrase receptacle;

repeating a step of accepting subsequent selectable objects until each phrase receptacle is populated; and displaying a modified phrase template as each phrase receptacle accepts a selectable object; and displaying, after each phrase receptacle is populated, a constructed statement having the predefined vocabulary and the selectable objects.

21. The method of claim 20 wherein the predefined vocabulary is in a computer language.

22. The method of claim 20 further comprising a step of enabling a modification to the constructed statement by enabling a user to select one of the selectable objects within one of the phrase receptacles, enabling a user to drag it off of the phrase receptacle, and enabling a user to drop a second selectable object within the phrase receptacle.

23. The method of claim 20 further comprising:

deleting from the phrase template, a phrase receptacle selected by the user to allow the user to use a portion of the phrase without a deleted qualifier.

24. A program on a computer usable medium for enabling a construction of a statement by a user through a user interface, the program on the computer usable medium comprising:

means for generating a displayed subphrase template, the subphrase template having at least one subphrase receptacle, the subphrase receptacle indicating a place-holder for a selectable object defining a choice for the subphrase;

means for generating a displayed phrase template for the statement, the phrase template having predefined vocabulary of the statement and at least one phrase receptacle, the phrase receptacle indicating a place-holder for a selectable object defining a choice for the statement;

means for accepting the selectable object within the phrase receptacle in response to a user dragging and dropping the selectable object onto the phrase receptacle from one of a menu of selectable objects and the subphrase template;

means for expanding the phrase receptacle to incorporate the subphrase template when the subphrase template is dragged and dropped onto the phrase receptacle; and means for displaying a constructed statement having the predefined vocabulary and the choice.

25. The program on a computer usable medium of claim 24 wherein the predefined vocabulary is a natural language.

26. The program on a computer usable medium of claim 24 wherein the statement is a query and the predefined vocabulary is a SQL language.

27. The program on a computer usable medium of claim 24 wherein the statement is a query and the selectable object is a searchable object.

28. The program on a computer usable medium of claim 24 further comprising means for enabling a modification of the constructed statement by allowing a selection and deletion of the selectable object within the phrase receptacle and allowing a subsequent acceptance of a second selectable object within the phrase receptacle.

29. The program on a computer usable medium of claim 28 wherein the means for enabling the modification further comprises:

means for deleting from the phrase template, a phrase receptacle selected by the user to allow the user to use a portion of the phrase without a deleted qualifier.

30. The program on a computer usable medium of claim 24 wherein at least one of the at least one phrase receptacle or subphrase receptacle has a graphical user interface interactor.

31. The program on a computer usable medium of claim 24 wherein at least one of the at least one phrase receptacle or subphrase receptacle has means for enforcing constraints by restricting a type of selectable object that is accepted.

32. The program on a computer usable medium of claim 24 wherein each phrase receptacle and subphrase receptacle has a graphical boundary representation and wherein the displayed constructed statement displays a subphrase structure of the statement through a visual nesting of the graphical boundary representations.

33. The program on a computer usable medium of claim 24 wherein the predefined vocabulary is in a computer language.

* * * * *